June 13, 1944.                D. SWAROVSKI                2,351,080
SIGNAL DEVICE
Filed March 4, 1940
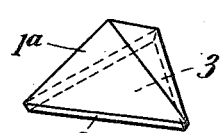 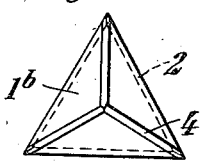 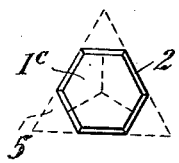 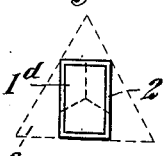
Fig.1   Fig.2   Fig.3   Fig.4
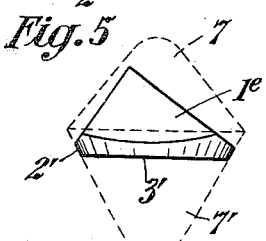 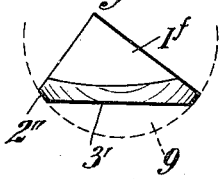 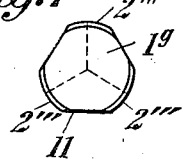
Fig.5   Fig.6   Fig.7
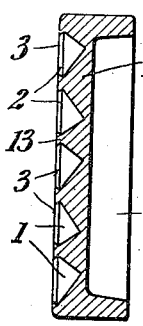 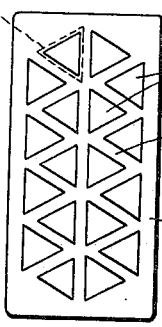 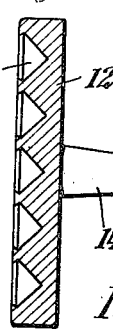 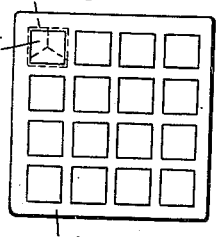
Fig.8   Fig.9   Fig.11   Fig.10
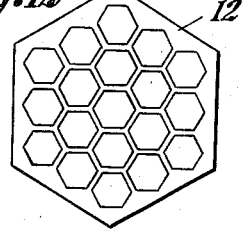
Fig.12
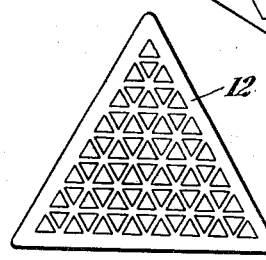
Fig.13
INVENTOR
DANIEL SWAROVSKI.
BY Karl A. Mayr
ATTORNEY Patented June 13, 1944

2,351,080

UNITED STATES PATENT OFFICE 2,351,080

SIGNAL DEVICE

Daniel Swarovski, Wattens, Tyrol, Germany; vested in the Alien Property Custodian Application March 4, 1940, Serial No. 322,151
In Germany February 11, 1939

1 Claim. (Cl. 88—78)

The present invention relates to signal devices which reflect light impinging upon same in the direction in which it arrives and which are particularly useful for traffic signals on highways, deck lights of vehicles, or for advertising purposes.

Conventional light signals, utilizing for instance the total reflection of triple prisms to reflect the entering light in the direction towards the source of light, are so constructed that the rear side of the glass plate has the prism forms. Proposals to cover the rear side of a plate of glass or another transparent material with individual prisms have been found impractical, because the manufacture of such light signals is very complicated. It has, however, been proposed to surround a reflecting surface forming, together with a cover plate, a one piece member, with a solidifying moldable mass tightly surrounding all sides of said member except for the surface into which the light enters. The usual metallic holders and casings of light signals must be very tightly closed, because the light signals, whether fixed or arranged at vehicles, are as a rule subjected to atmospheric actions. The different coefficients of expansion of glass and metal have an unfavorable effect. Water penetrated behind the surfaces of the reflecting members which may have the form of triple prisms reduces the reflection effect of triple prism surfaces having no mirror-foil or destroys the silver coating of reflecting surfaces.

Pressed glass bodies formed as a unit of known light signals have the disadvantage that the surfaces engaging the holder during manufacture often have unequal distances from each other or are uneven and partially warped so that a great deal of defective work results when mounting the metal holders. For removing this defect as well as for obtaining a better sealing rubber insertions have been provided the life of which, however, is short and which, moreover, due to their sulphur content have harmful effects on the silver coating. By assembling a plurality of different parts which are of different thickness rather different total dimensions result which make the exchange of the individual members difficult. Due to the ununiform mass distribution owing to the notches at the rear side, the glass bodies have interior stresses which cause fractures already at low strains due to exterior forces or temperature differences. Finally these glass bodies may only be used with the surface condition obtained by pressing and the thereby caused light losses due to undesired light diffusion, because the reflecting surfaces cannot be finished by a grinding and polishing operation due partially to the forming and partially to technical and economical reasons.

The present invention relates to light signals with individual juxtapositioned reflecting elements and the object of the invention is to avoid the above mentioned numerous disadvantages connected with conventional reflectors. The object of the present invention is to provide a light signal in which instead of the conventional one piece glass body a plurality of reflecting elements are individually produced and then combined.

In light signals according to the invention the light reflecting elements are arranged in rows and, except for their surfaces into which enters the light, are embedded in a common holder consisting of a mass capable of being pressed, presscast, cast, sprayed or atomized and of tightly connecting the elements.

If the adhesive capacity between the reflecting elements and the mass alone is not sufficient to securely hold the elements in the mass, the elements, preferably consisting of triple-prisms, are provided at the border of their light entrance face with facets overlapped by the embedding mass. According to the invention these facets may be made without performing a grinding operation by grinding the elements from double cones, double pyramids or balls the remaining surfaces of which form the facets. If facets are to be avoided the mass may overlap the edge of the light entrance surface.

During the manufacture of the common holder the mass of the latter shrinks upon the reflecting elements and perfectly tightly closes off the latter. In this connection it is of particular advantage that due to the smallness of the reflecting elements the difference of heat expansion between these elements at temperature changes, occurring when using the light signals in the open air, cannot effect a harmful or disadvantageous influence so that the elements permanently maintain a fixed and tight seat. All disadvantages connected with conventional reflectors and due to stresses occurring in large glass bodies are avoided by the present invention. Specially if the individual elements are in contact with each other along one edge only or are arranged at a slight distance from each other, i. e. are separated from each other by mass bridges, the particular advantage results that stresses due to temperature changes cannot occur in between the entire body. Moreover, the great danger of breakage of light signals comprising a glass body in one piece, is obviated. Experiments have proved that even heavy blows exerted upon a light signal according to the invention may destroy the individual reflecting elements only which are hit by the blows, whereas the adjacent elements remain safe and the reflection effect is by no means reduced.

The individual elements, forming the light signal, may in the hitherto usual manner be bright pressed. A substantially more complete optical effect is obtained, however, if either all or a part of the surfaces of the reflecting elements are ground and polished. Experiments have proved that this operation may economically be carried out.

In the accompanying drawing the invention is shown by way of example.

In this drawing:

Fig. 1 is a perspective view of a reflecting element according to the invention, Fig. 2 shows a modified reflecting element according to the invention, Fig. 3 illustrates a third form of reflecting elements according to the invention, Fig. 4 shows a fourth form of reflecting elements according to the invention, Fig. 5 is a side elevation of a triple prism ground from a double cone, according to the present invention.

Fig. 6 is a side elevation of a triple prism ground from a ball, according to the invention;

Fig. 7 illustrates a further form of a reflecting element, made according to the present invention.

Fig. 8 is a section through a light signal according to the invention,

Fig. 9 is a top plan view of the light signal illustrated in Fig. 8,

Fig. 10 is a top plan view of a modified light signal according to the invention, Fig. 11 shows a section through a modified light signal according to the invention, Fig. 12 illustrates a top plan view of a light board in the form of a hexagon according to the invention, Fig. 13 shows a light board in the form of a triangle.

Fig. 1 shows a perspective rear view of a triple prism 1ᵃ having small facets 2 at the light entrance surface 3. Fig. 2 shows a rear plan view of a triple prism 1ᵇ of similar construction. The edges 4 of the pyramid of this prism are provided with facets. According to Fig. 3 the corners 5 of the original light entrance surface 3 of triangular shape are cut away so that the remaining light entrance opening of the triple prism 1ᶜ forms a hexagon. According to Fig. 4 the corners 6 of the triangle are cut away in such a manner that a light entrance surface in the shape of a rectangle remains of the body 1ᵈ. Both figures show the small facets 2 which as a rule are desired for holding the element when being embedded in the mass.

Fig. 5 shows a side elevation of a triple prism 1ᵉ ground from a double cone 7, 7' whereby the facet 2' is formed, without performing a grinding operation, by the remaining conical surface. The triple prism also may be ground from a double pyramid. According to Fig. 6 the triple prism is ground in a similar manner from a ball 9. The facets 2'' are formed by the remaining spherical surface. The light entrance surfaces according to Figures 5 and 6 have circular form. If the surfaces of the triple prisms are ground so deep as to intersect with the light entrance surface 3' so that the conical surface or the spherical surface partially disappears, then the construction shown in Fig. 7 results according to which the light entrance surface of the triple prism 1ᵍ nearly forms a hexagon. The edges of the surfaces of the triple prism intersecting the light entrance surface are designated with 11. The facets 2''' in this case are present at three points only.

Fig. 8 shows a section through and Fig. 9 an elevation of a light signal 12 which for instance is adapted to be connected to the pedal crank of a bicycle. The light entrance surfaces 3 of the triple prisms 1 are embedded flush with the front surface of the holder 12, whereby the mass 13, present in bridge form between the light entrance surfaces, overlaps the facets 2. The rear side 10 of the holder is hollow for the purpose of saving costs. Fig. 10 shows a light signal provided with elements 1 having rectangular light entrance surfaces. Of course, facets 2 are present at all elements in spite of the fact that for the sake of simplicity they are not shown in Figs. 9 and 10.

A projection 14 may be provided on holder 12 as shown in Fig. 11 for attaching the device to other bodies.

Figs. 12 and 13 show further examples of light boards in the form of a hexagon and a triangle respectively.

For the manufacture of the holder, masses plastic when heated and capable of being hardened by additional heat which masses may be obtained on the market first of all come into consideration, i. e. such masses which in a hot state may be worked by a method of pressing, press-casting, or casting and eventually may be hardened by an additional supply of heat. Moreover, sprayable or atomizable metals may be used for the manufacture of the holders.

It is obvious that light signals according to the invention are free of such interior stresses as are unavoidable in connection with conventional light signals. The small reflecting elements 1 have very low stresses only which, moreover, have no effect whatever on the light signal itself in spite of the fact that the signal forms a unified piece. Elements are preferably provided with smooth upper surfaces so that the front side lying free after mounting may easily be cleaned by wiping. The reflecting elements may, however, be embedded somewhat deeper in the holder. The dimensions of the light signals produced in large masses are exactly equal, because they are made in exactly limited hollow molds. The tight and exact closure of the reflecting prism surfaces also is of particular importance and it is possible to arrange elements of different form, construction or diffusing in the light signal, for instance for the purpose of influencing the light distribution in between a given diffusion angle. Elements of different colours also may be embedded to obtain corresponding colour effects. Light signals according to the present invention constitute an improvement over conventional light signals because the quantity of glass used is considerably reduced and stamped metal holders, casings, rubber insertion and the like are avoided. The light signals according to the invention are far superior to the known signals because of the fact, that the prism surfaces may be ground. The superiority exists with regard to the reflection effect as well as with regard to the possibility of obtaining any desired diffusion of the reflected light by changing the angle of the pyramid as well as by hollow or convex grinding of the prism surfaces.

What I claim is:

In a signal device having a plurality of small slightly spaced reflecting elements arranged in a plurality of parallel rows, the combination comprising reflecting elements each of which has a plane light entrance surface and facet surfaces sloping outwardly and rearwardly from said light entrance surface, and a one piece holder of moldable material in which said elements are mounted, said holder tightly surrounding said elements except for the light entrance surfaces thereof and having a plane and uninterrupted face surface formed substantially by the light entrance surfaces of said elements to provide a unitary structure with said elements, the facet surfaces of said elements being covered by said holder, and each of said elements having a reflecting surface extending rearwardly from each facet surface and sloping inwardly and towards each other to meet in an apex, the portion of each element having the reflecting surfaces being embedded in said holder.

DANIEL SWAROVSKI.